(12) United States Patent
Kim et al.

(10) Patent No.: US 8,365,831 B2
(45) Date of Patent: Feb. 5, 2013

(54) DETERMINING CONNECTIVITY ARCHITECTURE IN 2-D AND 3-D HETEROGENEOUS DATA

(75) Inventors: Chul-Sung Kim, Houston, TX (US); Mark W. Dobin, Houston, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 371 days.

(21) Appl. No.: 12/679,641

(22) PCT Filed: Nov. 13, 2008

(86) PCT No.: PCT/US2008/083431
§ 371 (c)(1),
(2), (4) Date: Mar. 23, 2010

(87) PCT Pub. No.: WO2009/079123
PCT Pub. Date: Jun. 25, 2009

(65) Prior Publication Data
US 2010/0252270 A1    Oct. 7, 2010

Related U.S. Application Data

(60) Provisional application No. 61/008,048, filed on Dec. 18, 2007.

(51) Int. Cl.
*E21B 43/00* (2006.01)
(52) U.S. Cl. .......................... 166/369; 702/12
(58) Field of Classification Search .......... 166/369; 702/12
See application file for complete search history.

(56) References Cited

U.S. PATENT DOCUMENTS

| 4,809,240 A | 2/1989 | Mufti |
| 4,972,383 A | 11/1990 | Lailly |

(Continued)

FOREIGN PATENT DOCUMENTS

| GB | 2145508 | 3/1985 |
| WO | WO 2005/033739 | 4/2005 |

(Continued)

OTHER PUBLICATIONS

Cohen, L.D., and Deschamps, T., Grouping Connected Components Using Minimal Path Techniques. Application to Reconstruction of Vessels in 2D and 3D Images, 2001, Proceedings of the 2001 IEEE Computer Society; Conference on Computer Vision and Pattern Recognition, vol. 2, pp. 102-109.

(Continued)

*Primary Examiner* — William P Neuder
(74) *Attorney, Agent, or Firm* — ExxonMobil Upstream Research Company Law Department

(57) ABSTRACT

A method is disclosed for determining the connectivity architecture of a hydrocarbon reservoir in terms of locally optimal paths between selected source points, e.g. wells. In one embodiment of the invention, a fast-marching method (133) is used to compute the distance field (or the time of arrival field) from N selected source points in a heterogeneous media, i.e. in a non-uniform velocity field. This is done by propagating N labeled (132) fronts simultaneously from N objects. Then, a method (134) is disclosed for detecting Voronoi curves or Voronoi surfaces, where fronts of differing labels meet each other. Then, saddle points are found on the Voronoi curves or surfaces (135), and each saddle point is used to determine a locally optimal path (136) between a pair of equidistant (from the saddle point), closest (to the saddle point) source points.

17 Claims, 9 Drawing Sheets

U.S. PATENT DOCUMENTS

| | | | |
|---|---|---|---|
| 5,018,112 A | 5/1991 | Pinkerton et al. |
| 5,040,414 A | 8/1991 | Graebner |
| 5,159,833 A | 11/1992 | Graebner et al. |
| 5,388,445 A | 2/1995 | Walters et al. |
| 5,586,082 A | 12/1996 | Anderson et al. |
| 5,757,663 A | 5/1998 | Lo et al. |
| 5,798,982 A | 8/1998 | He et al. |
| 5,835,882 A | 11/1998 | Vienot et al. |
| 6,012,018 A | 1/2000 | Hornbuckle |
| 6,052,650 A | 4/2000 | Assa et al. |
| 6,128,577 A | 10/2000 | Assa et al. |
| 6,246,963 B1 | 6/2001 | Cross et al. |
| 6,307,964 B1 | 10/2001 | Lin et al. |
| 6,393,906 B1 | 5/2002 | Vityk et al. |
| 6,401,042 B1 | 6/2002 | Van Riel et al. |
| 6,514,915 B1 | 2/2003 | Beyer et al. |
| 6,549,879 B1 | 4/2003 | Cullick et al. |
| 6,618,678 B1 | 9/2003 | Van Riel |
| 6,661,000 B2 | 12/2003 | Smith et al. |
| 6,674,689 B2 | 1/2004 | Dunn et al. |
| 6,690,820 B2 | 2/2004 | Lees et al. |
| 6,754,588 B2 | 6/2004 | Cross et al. |
| 6,810,332 B2 | 10/2004 | Harrison |
| 6,823,266 B2 | 11/2004 | Czernuszenko et al. |
| 6,826,483 B1 | 11/2004 | Anderson et al. |
| 6,912,467 B2 | 6/2005 | Schuette |
| 6,950,751 B2 | 9/2005 | Knobloch |
| 6,985,841 B2 | 1/2006 | Barroux |
| 6,987,878 B2 | 1/2006 | Lees et al. |
| 7,013,218 B2 | 3/2006 | Baker et al. |
| 7,024,021 B2 | 4/2006 | Dunn et al. |
| 7,092,824 B2 | 8/2006 | Favret et al. |
| 7,113,869 B2 | 9/2006 | Xue |
| 7,124,030 B2 | 10/2006 | Ellis |
| 7,174,254 B2 | 2/2007 | Ellis |
| 7,210,342 B1 | 5/2007 | Sterner et al. |
| 7,249,009 B2 | 7/2007 | Ferworn et al. |
| 7,297,661 B2 | 11/2007 | Beyer et al. |
| 7,337,660 B2 | 3/2008 | Ibrahim et al. |
| 7,344,889 B2 | 3/2008 | Kelemen et al. |
| 7,387,021 B2 | 6/2008 | DiFoggio |
| 7,395,691 B2 | 7/2008 | Sterner et al. |
| 7,520,158 B2 | 4/2009 | DiFoggio |
| 7,526,418 B2 | 4/2009 | Pita et al. |
| 7,529,626 B1 | 5/2009 | Ellis |
| 7,739,089 B2 | 6/2010 | Gurpinar |
| 2002/0013687 A1 | 1/2002 | Ortoleva |
| 2002/0038201 A1 | 3/2002 | Balaven et al. |
| 2002/0049575 A1 | 4/2002 | Jalali et al. |
| 2002/0067373 A1 | 6/2002 | Roe et al. |
| 2002/0097912 A1 | 7/2002 | Kimmel et al. |
| 2002/0099504 A1 | 7/2002 | Cross et al. |
| 2002/0120429 A1 | 8/2002 | Ortoleva |
| 2003/0200030 A1 | 10/2003 | Meldahl |
| 2004/0020642 A1 | 2/2004 | Vinegar et al. |
| 2004/0148147 A1 | 7/2004 | Martin |
| 2004/0210547 A1 | 10/2004 | Wentland et al. |
| 2004/0220790 A1 | 11/2004 | Cullick et al. |
| 2004/0254734 A1 | 12/2004 | Zabalza-Mezghani et al. |
| 2005/0021234 A1 | 1/2005 | Han |
| 2005/0096893 A1 | 5/2005 | Feraille et al. |
| 2005/0149307 A1 | 7/2005 | Gurpinar et al. |
| 2005/0171700 A1 | 8/2005 | Dean |
| 2005/0199391 A1 | 9/2005 | Cudmore et al. |
| 2005/0209866 A1 | 9/2005 | Veeningen et al. |
| 2005/0209912 A1 | 9/2005 | Veeningen et al. |
| 2005/0213809 A1 | 9/2005 | Lees et al. |
| 2005/0234690 A1 | 10/2005 | Mainguy et al. |
| 2005/0256647 A1 | 11/2005 | Ellis |
| 2006/0014647 A1 | 1/2006 | Beyer et al. |
| 2006/0041409 A1 | 2/2006 | Strebelle et al. |
| 2006/0047489 A1 | 3/2006 | Scheidt et al. |
| 2006/0052938 A1 | 3/2006 | Thorne et al. |
| 2006/0092766 A1 | 5/2006 | Shelley et al. |
| 2006/0235666 A1 | 10/2006 | Assa et al. |
| 2006/0235667 A1 | 10/2006 | Fung et al. |
| 2006/0235668 A1 | 10/2006 | Swanson et al. |
| 2006/0241867 A1 | 10/2006 | Kuchuk et al. |
| 2006/0265204 A1 | 11/2006 | Wallis et al. |
| 2006/0277012 A1 | 12/2006 | Ricard et al. |
| 2006/0277013 A1 | 12/2006 | Bennis et al. |
| 2006/0282243 A1 | 12/2006 | Childs et al. |
| 2006/0287201 A1 | 12/2006 | Georgi et al. |
| 2006/0293872 A1 | 12/2006 | Zamora et al. |
| 2007/0005253 A1 | 1/2007 | Fornel et al. |
| 2007/0011646 A1 | 1/2007 | Chrisochoides et al. |
| 2007/0013690 A1 | 1/2007 | Grimaud et al. |
| 2007/0016389 A1 | 1/2007 | Ozgen |
| 2007/0027666 A1 | 2/2007 | Frankel |
| 2007/0143024 A1 | 6/2007 | Michel et al. |
| 2007/0156377 A1 | 7/2007 | Gurpinar et al. |
| 2007/0219724 A1 | 9/2007 | Li et al. |
| 2007/0219725 A1 | 9/2007 | Sun et al. |
| 2007/0242564 A1 | 10/2007 | Devi |
| 2007/0265778 A1 | 11/2007 | Suter et al. |
| 2008/0040086 A1 | 2/2008 | Betancourt et al. |
| 2008/0059140 A1 | 3/2008 | Salmon et al. |
| 2008/0097735 A1 | 4/2008 | Ibrahim et al. |
| 2008/0099241 A1 | 5/2008 | Ibrahim et al. |
| 2008/0147326 A1 | 6/2008 | Ellis |
| 2008/0173804 A1 | 7/2008 | Indo et al. |
| 2009/0071239 A1 | 3/2009 | Rojas et al. |
| 2010/0155078 A1 | 6/2010 | Walters et al. |

FOREIGN PATENT DOCUMENTS

| | | |
|---|---|---|
| WO | WO 2006/127151 | 11/2006 |
| WO | WO 2007/007210 | 1/2007 |
| WO | WO 2007/063442 | 6/2007 |
| WO | WO 2007/106244 | 9/2007 |
| WO | WO 2008/100614 | 8/2008 |
| WO | WO 2009/079123 | 6/2009 |
| WO | WO 2009/082563 | 7/2009 |
| WO | WO 2009/094064 | 7/2009 |
| WO | WO 2009/114211 | 9/2009 |
| WO | WO 2010/008647 | 1/2010 |

OTHER PUBLICATIONS

Dijktra's method, A Note on Two Problems in Connection With Graphs, Numerische Mathematic , 1959, vol. 1, pp. 269-271.

Kimmel, R., and Sethian, J.A., Fast Voronoi Diagram and Offsets on Triangulated Surfaces, Jul. 1999, AFA Conference on Curves and Surfaces, Saint-Malo, France, pp. 193-202.

Pathak, P., et al., Rock Structure and Transport Therein: Unifying With Voroni Models and Percolation Concepts, 1980, Society of Petroleum Engineers, pp. 381-395.

Rawlinson, N. and Sambridge, M., Wave Front Evolution in Strongly Heterogeneous Layered Media Using Fast Marching Method, 2004, Geophysical Journal International, vol. 156, No. 3, pp. 631-647.

Sethian, J.A., Optimality and First Arrivals, Level Set Methods and Fast Marching Methods, 1996, Cambridge University Press, pp. 284-286.

Ainsworth, R.B., (2005) "Sequence Stratigraphic-Based Analysis of Depositional Architecture—A Case Study From a Marginal Marine Depositional Setting," *Petro. Geoscience*, v. 11, pp. 257-276.

Allen, J.R.L., (1978), "Studies in Fluviatile Sedimentation; An Exploratory Quantitative Model for the Architecture of Avulsion-Controlled Alluvial Sites," Sedimentary Geology, v. 21(2), pp. 129-147.

Barton, M., et al., (2004), "Understanding Hydrocarbon Recovery in Deepwater Reservoirs; Modeling Outcrop Data in the Third Dimension," *AAPG*, v. 13, pp. 11.

Dijkstra, E.W. (1959), "A Note on Two Problem in Connection with Graphs", *Numerische Mathematic* 1, pp. 269-271.

Elshahawi, H., et al., (2000) "Correcting for Wettability and Capillary Pressure Effects on Formation Tester," SPE 63075.

Firoozabadi, A., et al. (1998), "Surface Tension of Water-Hydrocarbon Systems at Reservoir Conditions," *J. of Canadian Petro. Tech., Reservoir Engineering*, v. 41, 8 pgs.

Fowler, J. et al. (2000), "Simultaneous Inversion of the Ladybug prospect and derivation of a lithotype volume", 2000 SEG Expanded Abstracts, 3 pgs.

Gainski, M. et al. (2008) "The Schiehallion Field: Detection of Reservoir Compartmentalisation and Identification of New Infill Targets Using 4D Seismic Surveys and Dynamic Production Data, Reservoir Compartmentalization", [Online], pp. 32. Retrieved from the Internet: URL:http//www.geolsoc.org.uk/webdav/site/GSL/shared/pdfs/events/abstracts/Reservoir AbstractBook.pdf.

James, W.R. et al. (2004), "Fault-Seal Analysis Using a Stochastic Multi-Fault Approach," *AAPG Bulletin*, v. 88(7), pp. 885-904.

Justwan, H.K., et al. (2008), "Unraveling Dynamic Fluid Connectivity Through Time-Lapse Geochemistry—From Example From the Ringhome Field, Norway," AAPG Int'l Conf and Exhibition, Cape Town, South Africa 2008.

King, P.R. (1990), "The Connectivity and Conductivity of Overlapping Sand Bodies," The Norwegian Institute of Technology (Graham & Trotman), pp. 353-362.

Larne, D.K., et al. (2006), "Connectivity of Channelized Reservoirs: A Modeling Approach," *Petro. Geoscience*, v. 12, pp. 291-308.

Lescoffit, G., et al. (2005), "Quantifying the Impact of Fault Modeling Parameters on Production Forecasting for Clastic Reservoirs," *AAPG Hedberg Series*, No. 2, pp. 137-149.

McCain, W.D., Jr. (1991), "Reservoir-Fluid Property Correlations—State of the Art," *SPERE*, p. 266.

Manzocchi, T., et al. (2008), "Sensitivity of the Impact of Geological Uncertainty on Production From Faulted and Unfaulted Shallow-Marine Oil Reservoirs: Objectives and Methods," *Petro. Geoscience*, v. 14, pp. 3-15.

Richards, B., et al. (2008), "Reservoir Connectivity Analysis of a Complex Combination Trap Terra Nova Field, Jeanne d'Arc Basin, Newfoundland, Canada," Reservoir Compartmentalization, London Geological Society, p. 59.

Sales, J.K. (1997), "Seal Strength Vs. Trap Closure; A Fundamental Control on the Distribution of Oil and Gas, In: Seals, Traps, and the Petroleum System," *AAPG*, v. 67, pp. 57-83.

Schlumberger (2004), "Managing Uncertainty in Oilfield Reserves," *Middle East Well Evaluation Review*, v. 12, 11 pgs.

Sethian, J.A. (1996), "Level set methods and fast marching methods", Cambridge University Press, pp. 284-286.

Snedden, J.W., et al. (2007), "Reservoir Connectivity: Definitions, Examples and Strategies," IPTC 11375, Int'l. Petro. Tech. Conf., Dubai, UAE, Dec. 4-6, 2007, 6 pgs.

Stright, L. (2005), "Modeling, Upscaling and History Matching Thin, Irregularly-Shaped Flow Barriers: A Comprehensive Approach for Predicting Reservoir Connectivity," 2005 SPE Annual Tech. Conf. & Exh., Oct. 24-27, 2005, 8 pgs.

Sumpter, L., et al. (2008), "Early Recognition of Potential Reservoir Compartmentalization," Reservoir Compartmentalization, London Geological Society, Mar. 5-6, 2008, p. 84.

Sweet, M.L., et al. (2007), "Genesis Field, Gulf of Mexico: Recognizing Reservoir Compartments on Geologic and Production Timescales in Deep-Water Reservoirs," *AAPG*, v. 91, pp. 1701-1729.

Vrolijk, P.J., et al. (2005), "Reservoir Connectivity Analysis—Defining Reservoir Connections and Plumbing," SPE 93577, 23 pgs.

*International Search report and Written Opinion*, dated Mar. 13, 2009, PCT/US2009/031578.

Nishida, T., and Sugihara, K., "FEM-like Fast Marching Method for the Computation of the Boat-Sail Distance and the Associated Voronoi Diagram", Technical Report METR 2003-45, Department of Mathematical Informatics, University of Tokyo (2003).

Justwan, H., et al., "Characterization of Static and Dynamic Reservoir Connectivity for the Ringhome Field, Through Integration of Geochemical and Engineering Data," Reservoir Compartmentalization, London Geological Society, Mar. 5-6, 2008, p. 21.

DETERMINING CONNECTIVITY ARCHITECTURE IN 2-D AND 3-D HETEROGENEOUS DATA

CROSS-REFERENCE TO RELATED APPLICATION

This application is the National Stage entry under 35 U.S.C. 371 of PCT/US2008/083431 that published as WO2009/079123 and was filed on 13 Nov. 2008, which claims the benefit of U.S. Provisional Patent Application 61/008,048 filed 18 Dec. 2007 entitled, Determining Connectivity Architecture In 2-D and 3-D Heterogeneous Data, each of which is incorporated by reference, in its entirety, for all purposes.

FIELD OF THE INVENTION

This invention relates generally to the field of geophysical prospecting, including reservoir delineation. More particularly, the invention is a method for determining locally optimal connected paths that characterize connectivity architecture of multiple objects in two-dimensional and three-dimensional data. This method could be applied to data models that describe subsurface geology or subsurface hydrocarbon reservoirs. Typical geologic data volumes include seismic and seismic derived data volume, geologic model data volume, and reservoir simulation model data volume.

SUMMARY OF THE INVENTION

In one general aspect, a method for assessing connectivity between two or more objects in a hydrocarbon reservoir in order to manage development of the reservoir includes (a) specifying a data volume of data elements on a discrete two or three-dimensional grid, said data representing a selected characteristic of the hydrocarbon reservoir at each cell in the grid; (b) specifying location of at least two objects in the data volume; (c) determining all Voronoi curves (2-D) or surfaces (3-D) in the data volume for the at least two objects as propagation seeds, said Voronoi curves or surfaces defining where fronts started simultaneously from each object meet, wherein front propagation speed at each cell location is a function of the data element at that cell; (d) locating all saddle points on the Voronoi curves/surfaces; (e) for each saddle point, finding a locally optimal path between two objects nearest to the saddle point by finding optimal paths between the saddle point and the two objects; and (f) assessing connectivity of the at least two objects based on the locally optimal paths connecting them.

Implementations of this aspect may include one or more of the following features. For example, the data volume may be a seismic attribute data volume. The data volume may be heterogeneous, meaning the data elements in all cells do not have the same value. The objects may consist of existing or proposed production or injection wells. The Voronoi curve/surface may be determined using a front propagation speed function based on the seismic attribute. The Voronoi curve/surface may be determined from a distance field representing front propagation distance from each of a corresponding pair of nearest objects. The fronts may be propagated to generate the distance field by solving an Eikonal equation using the front propagation speed function. The Eikonal equation may be solved by a fast marching method. The Voronoi curve/surface may be determined by detecting top of ridges of the distance field. Each saddle point may be distinguished from neighboring points on the Voronoi curve/surface by having locally minimum front arrival times. The locally optimal path may be found by tracing backward through the distance field from the saddle point to each of the two nearest objects. The reservoir's connectivity architecture may be inferred from the locally optimal paths. The Voronoi curves/surfaces may be determined by assigning a unique label to each seed object, then labeling cells in the grid to track progress of the propagating fronts. The reservoir's connectivity architecture may be used to manage development of the reservoir. The selected characteristic of the hydrocarbon reservoir may be porosity or transmissibility. The reservoir may be developed to produce hydrocarbons based at least in part on the connectivity assessment. Hydrocarbons may then be produced from the reservoir.

In another general aspect, a method for producing hydrocarbons from a subsurface reservoir includes (a) obtaining an assessment of connectivity of different parts of the reservoir, said connectivity assessment having been made by steps comprising: (i) specifying a data volume of data elements on a discrete two or three-dimensional grid, said data representing a selected characteristic of the subsurface hydrocarbon reservoir at each cell in the grid; (ii) specifying location of at least two objects in the data volume; (iii) determining all Voronoi curves (2-D) or surfaces (3-D) in the data volume for the at least two objects as propagation seeds, said Voronoi curves or surfaces defining where fronts started simultaneously from each object meet, wherein front propagation speed at each cell location is a function of the data element at that cell; (iv) locating all saddle points on the Voronoi curves/surfaces; (v) for each saddle point, finding a locally optimal path between two objects nearest to the saddle point by finding optimal paths between the saddle point and the two objects; and (vi) assessing connectivity of the at least two objects based on the locally optimal paths connecting them; (b) relating each of the at least two objects to different parts of the reservoir; and (c) developing the reservoir to produce hydrocarbons based at least in part on the connectivity assessment.

In some embodiments of the invention, fronts are propagated using a fast marching method. In some embodiments of the invention, the objects are wells in a hydrocarbon reservoir, the selected characteristic of the hydrocarbon reservoir is porosity or transmissibility or a seismic attribute, the data volume is heterogeneous, and reservoir connectivity is assessed by determining all locally optimal paths between the two or more objects.

BRIEF DESCRIPTION OF THE DRAWINGS

The present invention and its advantages will be better understood by referring to the following detailed description and the attached drawings in which.

Figure 1:
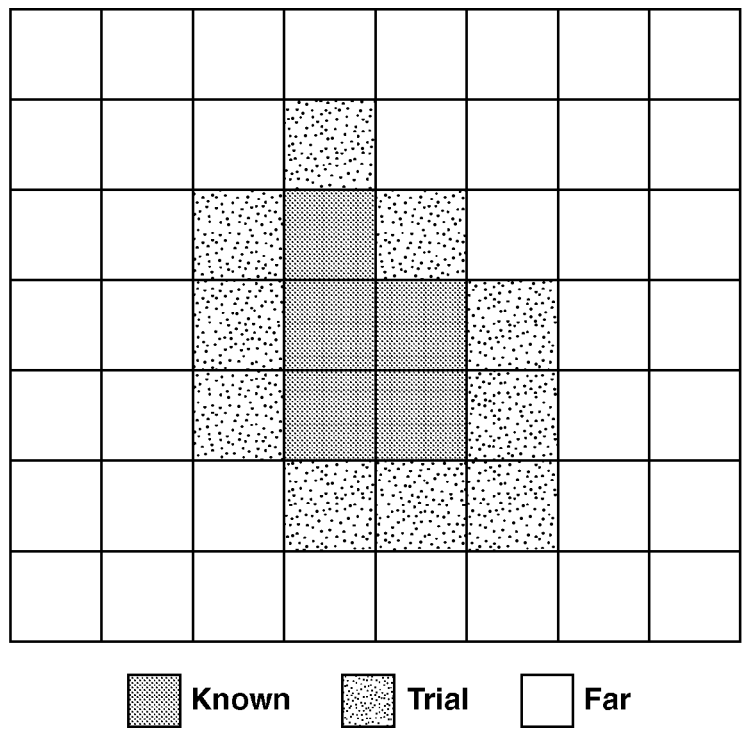
FIG. 1 illustrates states (known, trial or far) of cells in a typical fast marching method.

The invention will be described in connection with its preferred embodiments.

However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF EXAMPLE EMBODIMENTS

In one embodiment of the present invention, a fast-marching method is used to compute the distance field (or the time of arrival field) from N objects in a heterogeneous media. This is done by propagating N labeled fronts simultaneously from N objects. Then, a method is disclosed for detecting Voronoi points or Voronoi surfaces, where fronts of differing labels meet each other. Then, a method is disclosed for determining saddle points among detected Voronoi points. Each saddle point is then used to determine one or more locally optimal paths between a pair of equidistant (from the saddle point), closest (to the saddle point) objects.

Understanding reservoir connectivity is critical to the management of an oil or gas asset from exploration to abandonment. Connectivity assessment can greatly affect decisions made in all phases of asset's life cycle from optimally determining initial well locations to improving reservoir management decisions later in the field's life. Specifically, this invention presents an efficient method of determining connectivity architecture of multiple objects in a heterogeneous geologic data volume, which describe porous geobodies such as sand deposits capable of being hydrocarbon reservoirs, scattered throughout a nonporous medium like shale. The objects may include, but are not limited to, injection wells, production wells, and gas and water contacts or any other data points in hydrocarbon reservoirs. In the present invention, the basic components of connectivity architecture are the locally optimal paths between a pair of objects. For connectivity architecture of multiple objects, a method is provided for identifying pairs of objects that form Voronoi edges in two dimension or Voronoi surfaces in three dimensions. Then, a method is provided for determining locally optimal paths that connect these identified pairs of objects.

A path is locally optimal if any neighboring path that deviates from this path has a larger distance. The limitation to paths within a specified neighborhood differentiates the definition of a locally optimal path from that of the globally optimal path. Here, the distance of a path is measured by the travel time of a path. When speed at each location is the same (i.e. a homogeneous medium), there is only one locally optimal path (i.e, path of shortest distance) between two points or two objects. However, when speed is a function of location (i.e. a heterogeneous medium), there can be more than one locally optimal path.

The problem of determining an optimal path between two objects in a heterogeneous medium, where speed of propagation is a function of a location, can be solved by many different approaches. One efficient method is that of using a fast marching method suggested by J. A. Sethian in *Level set methods and fast marching methods*, Cambridge University Press, 284-286 (1996). A more difficult problem is that of determining all locally optimal paths between two objects in a heterogeneous media. The present inventors (PCT Patent Application Publication No. WO 2006/127151) disclose a method for determining N best paths and their quality between two objects. However, these N best paths are not guaranteed to be locally optimal in their path quality. The present invention describes a method for determining all locally optimal paths between two objects as well as among multiple objects.

A few publications discuss the use of Voronoi diagram for a medium in which the distance metric changes at cell locations, i.e. for a heterogeneous medium. Nishida and Sugihara ("FEM-like fast marching method for the computation of the boat-sail distance and the associated Voronoi diagram," paper available for download at http://citeseer.ist.psu.edu/647402.html) use a modified fast-marching method, called a FEM-like fast marching method, to compute Boat-Sail distance and associated Voronoi diagram, in which the boat sail distance with a constant boat speed is affected by an arbitrary continuous flow field. In the description of their method, their technique is designed to find a closest harbor (or a closest point) from a current boat position and the optimal path to that harbor among N possible harbors. They did not describe any method for finding locally optimal paths among multiple objects where boat speed changes at cell level (heterogeneous media).

Sethian briefly mentions (p. 268) that, for a Euclidian distance metric, Voronoi diagrams can be constructed by using a fast-marching method. Kimmel and Sethian ("Fast voronoi diagrams and offsets on triangulated surfaces," *Proceedings, AFA Conference on Curves and Surfaces*, Saint-Malo, France (July, 1999)) also present a fast marching based method for computing Voronoi diagrams on triangulated manifolds, again with Euclidian metric. But neither reference discusses locally optimal paths in heterogeneous media.

David Frankel addresses the subject of reservoir connectivity and geologic models in "Characterizing Connectivity in Reservoir Models Using Paths of Least Resistance, international patent publication number WO 2005/033739 A2," which uses "shortest path" algorithm, or "Dijktra's method," to determine an optimal path. This method is restricted to determining an optimal path between two objects. Moreover, an optimal path thus obtained appears to be less accurate than an optimal path obtainable by using a method such as that disclosed in the previously referenced Patent Publication No. WO 2006/127151 or the method suggested by Sethian in his book. This is because Dijktra's method solves a discrete network problem while a method such as Sethian's tries to approximate a continuous solution to the problem, thereby avoiding the grid effect of Dijktra's method, i.e. Dijktra's solution is affected by the orientation of the grids. In addition, Frankel does not disclose any method for determining locally optimal paths that describe connectivity architecture among multiple objects.

There is thus a need for a method for determining connectivity architecture of multiple objects in structured or unstructured three dimensional grid volumes of heterogeneous attributes, which corresponds to finding alternative flow paths among multiple wells or between geologic objects in a hydrocarbon reservoir with heterogeneous attributes or heterogeneous permeability. The present invention satisfies this need.

Distance Field Computation with Fast Marching Method

The present invention takes an approach of measuring the connected quality or the distance between two objects in a geologic model as the time needed to propagate a front from one object to the other. Here, the speed of the propagation of the front is proportional to the attributes of the cells in a geologic data volume. The basic computational module is a numerical method that computes propagating interface from an initial interface expanding outward, where the speed or the transmissibility is always positive.

The equation describing the front propagation is:

$$|\Delta T|F=1 \tag{1}$$

$$T(x, y)=0 \text{ on } \Gamma(t=0), \tag{1a}$$

where $\Gamma(t=0)$ is the initial location of the interface at time t=0, $$\text{Front}=\Gamma(t)=\{(x, y)|T(x, y)=t\},$$

T(x, y) is the time of arrival at a cell located at (x, y), and F(x, y) is the speed of the propagation at a cell (x, y).

A numerical method is employed to compute T(x, y) at all cell locations given the initial condition specified in equation (1a) and the speed F(x, y) at all (x, y) locations. The initial condition (1a) applies to the cells at seed locations. In this method, the speed F depends only on position and it becomes the "Eikonal" equation. A fast numerical method known as a fast-marching method may be used to solve equation (1) above in a three-dimensional space. However, the invention is not limited to the fast-marching method. Any method that solves the "Eikonal" equation or computes a distance field, such as for example a less accurate method known as Dijktra's method ("A Note on Two Problems in Connection with Graphs," *Numerische Mathematic* 1, 269-271 (1959)), may be employed.

Methods for Determining Voronoi Points

In heterogeneous media, where the distance metric at each cell or the speed of propagation at each cell changes, each segment of the Voronoi diagram is no longer a linear line; instead, it becomes a curve. A method will now be described for determining Voronoi points or critical points that forms Voronoi non-linear surface in 3 dimensions or Voronoi curves in two dimensions This is done by propagating N labeled fronts from N seed points and detecting Voronoi points or Voronoi cells. In this document, this procedure will be called a labeled fast marching method.

In a normal fast marching method, all cells belong to one of the three categories: Known, Trial, and Far. FIG. 1 shows a state of propagation (or arrival time computation) during an iterative process of a typical fast marching method. Here, Known cells (darker shading) are cells for which the arrival times have been already determined and accepted. Trial cells (dotted squares) are a band of cells surrounding the Known cells, which have computed but not yet accepted arrival times. Far cells (white) are the remaining cells, for which the arrival times are yet to be computed. In an immediately following iteration of a fast marching method, a Trial cell with an earliest arrival time is accepted to become a Known cell. Then, the time of arrival of its four neighbors (or six neighbors in 3D-space) are updated according to equation (1) above. On a 2D Cartesian grid, Sethian (p. 86 of his book) showed that the time of arrival at cell $(x_i, y_j)$ can be computed or updated by solving the equation below.

$$\max((t_{i,j}-t_{i-1,j}),(t_{i,j}-t_{i+1,j})0)^2+ \\ \max((t_{i,j}-t_{i,j-1}),(t_{i,j}-t_{i,j+1}),0)^2=(1/f_{i,j})^2 \tag{2}$$

where $t_{i,j}$ is $T(x_i, y_j)$ and $f_{i,j}$ is the speed F at $(x_i, y_j)$.

Figure 2:
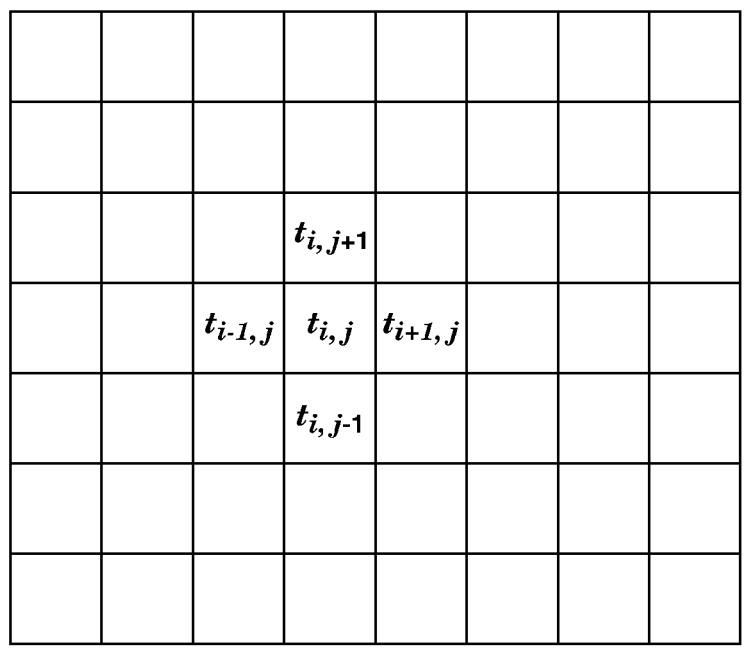
FIG. 2 shows cell or grid indices in a 2D grid.

There is more than one known method of solving the equation (2) for $t_{i,j}$ given $t_{i-1,j}$, $t_{i+1,j}$, $t_{i,j+1}$, $t_{i,j-1}$, and $f_{i,j}$. In the present invention, a preferred method is the following. With reference to cell indices in a two-dimensional grid as shown in FIG. 2, $t_{i-1,j}$ is the newly accepted arrival time at cell (i-1,j) and $t_{i,j}$ is being updated.

Figure 3:
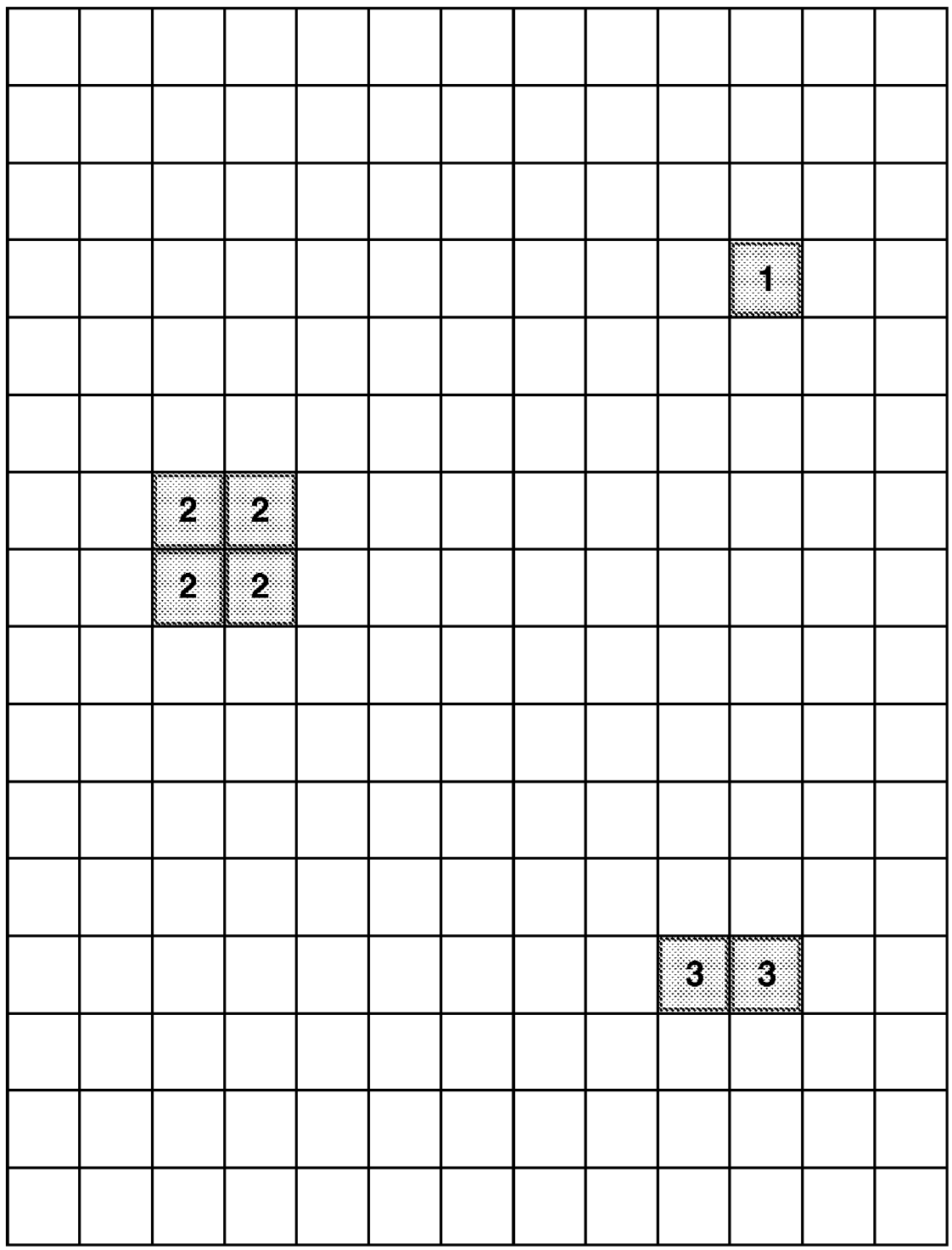
FIG. 3 illustrates three seeds (sources) in a 2D grid.
Figure 12:
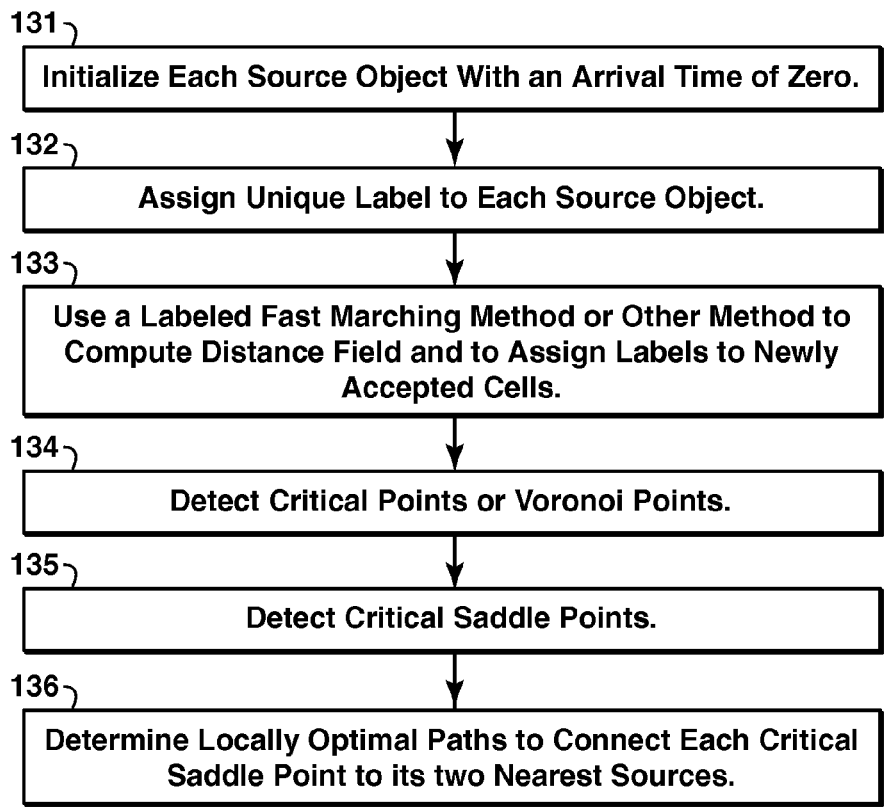

(i) Let $t_i$ be $\min(t_{i-1,j}, t_{i+1,j})$.
(ii) Let $t_j$ be $\min(t_{i,j-1}, t_{i,j+1})$.
(iii) If $t_i+(1/f_{i,j})$ is less than $t_j$, then $t_{i,j}=t_i+(1/f_{i,j})$.
(iv) Otherwise, $t_{i,j}=(t_i+t_j+\sqrt{2(1/f_{i,j})^2-(t_i-t_j)^2})/2$ In a labeled fast marching method of one embodiment of this invention, the process begins with two or more seeds or sources from which simultaneous fast marching starts. FIG. 3 shows an example of three sources. Here, it may be noted that a source can be composed of more than one cell. Initially, as shown in step 131 of the flowchart of FIG. 12, cells in each source are assigned arrival time of zero. Then in step 132, cells in each source are assigned labels that are unique to each source. In FIG. 3, the three sources are labeled as 1, 2, and 3. In a labeled fast marching method, as in step 133 in the flowchart of FIG. 12, these labels are propagated along with the arrival time computation described in equation (2) following a detailed arrival time computation procedure (i) through (iv) above. Specifically, propagations of labels may be performed as follows:

(a) Initially, all the cells have no labels except at the sources.
(b) If arrival time at a cell (i, j) is updated from one cell, as in step (iii) above, the labels at cell at (i, j) are updated by combining the label(s) of the cell (i, j) and the label(s) of the cell from which the arrival time was computed.
(c) Labels from two cells are combined as follows:
If two cells have a common label or common labels, the common label(s) becomes the resulting label. If two cells do not have at least one common label, the union of the labels from two cells becomes the resulting label.
(d) When the arrival time at cell (i, j) is computed from two cells, as in step (iv) above, the label(s) at (i, j) is combined with the label(s) of one of the two cells by using the label combining method in (c) above. Then the resulting labels are further combined with the label(s) of the other of the two cells.

Figure 4:
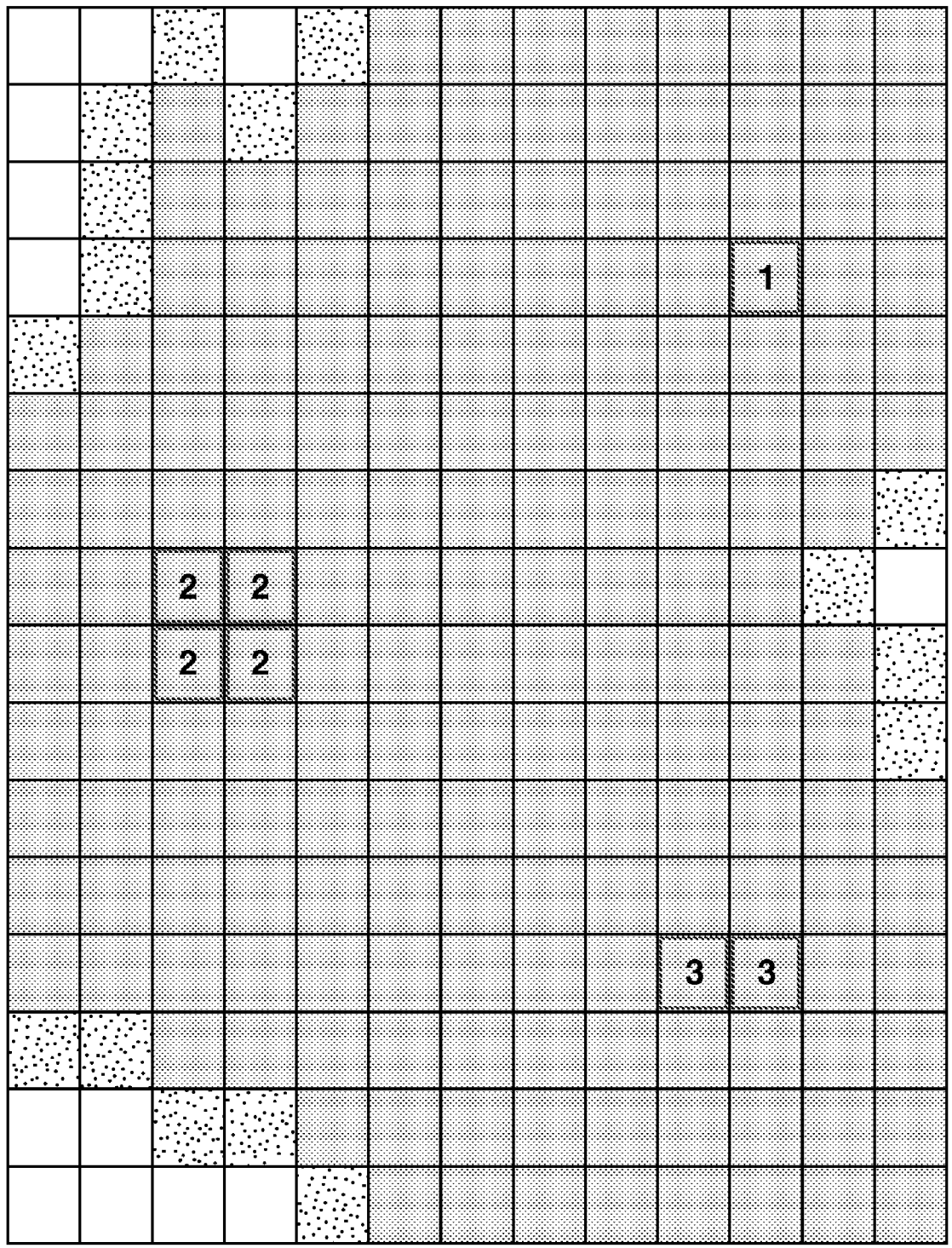
FIG. 4 shows an example of propagated labels from the three sources shown in FIG. 3.

FIG. 4 shows an example of labels thus assigned for the three sources in FIG. 3. Here, the cells with two labels, for example label 1 and label 2, indicate that the arrival times at these cells are computed from two cells of different labels: in turn, it means that two fronts, which started from different seed points, are meeting each other at this cell. Therefore, the cells with two labels are equidistant from the two sources and are identified as Voronoi points (step 134 in the flow chart of FIG. 12). By similar reasoning, the cells with three labels are equidistant from three sources: Voronoi vertex. In addition, any cell that abuts a cell of different label is detected as a Voronoi point because the boundary between these two cells is the place where two propagating fronts from different sources meet each other. In this document, these Voronoi points or Voronoi cells in heterogeneous media are called critical points or critical cells.

The method of propagating labels along with time of arrival computation is not essential to the present inventive method. It is one way of tracking the simultaneous propagation of fronts from multiple sources in an inhomogeneous medium, and identifying where the fronts meet. If labels are used, schemes other than the one suggested above may be devised.

Figure 5A:
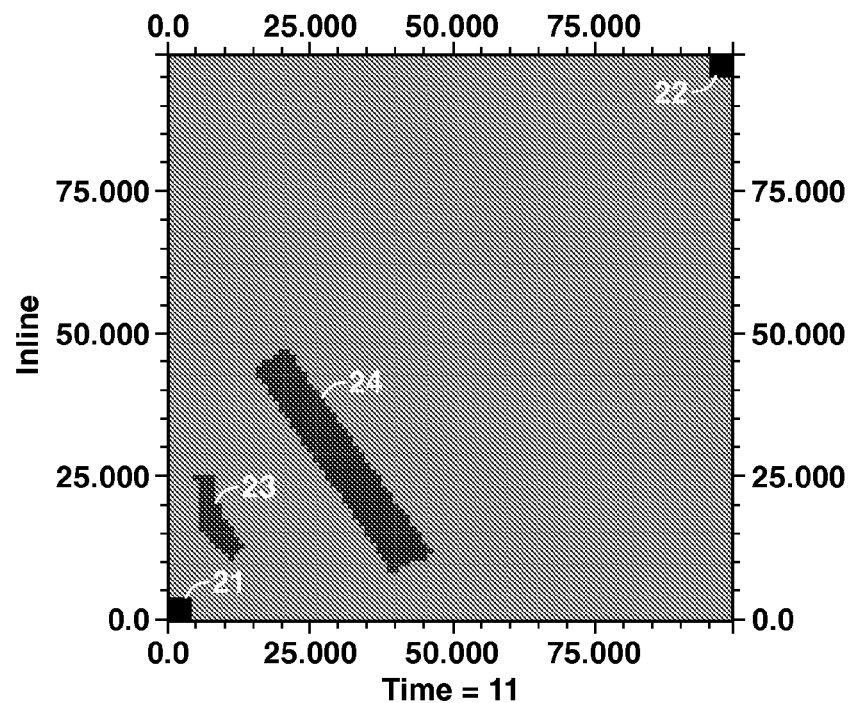
FIG. 5A shows an example two-dimensional inhomogeneous medium with two barriers of zero propagation speed and two seed points.
Figure 5B:
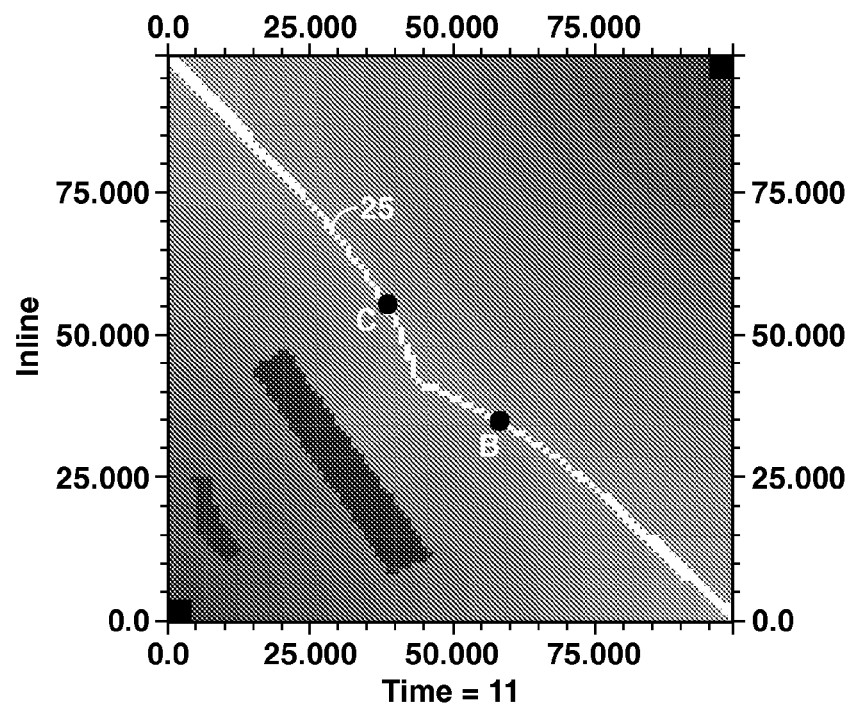
FIG. 5B shows a computed distance field in gray scale, based on the seed points and propagation speed function of FIG. 5A, and also shows critical points (Voronoi curve) and critical saddle points.

An example two-dimensional space in FIG. 5A is considered an inhomogeneous media because the speed of propagation is 1 unit in the gray area while the speed of propagation is zero in the black areas 23 and 24. In FIG. 5A, the two seed points are 22 located at upper-right and 21 at bottom-left corners. FIG. 5B shows the distance field computed by using a fast marching method by propagating fronts from the two seed points simultaneously. The fronts from seed point 21 must propagate around the barriers 23 and 24 in order to meet the fronts from seed point 22. In FIG. 5B, darker shades of the gray scale represent early arrival time (shorter distance) from either of the seed points. The white cells along the diagonal curve 25 (from top left to bottom right) are detected as critical points, where two fronts with differing labels meet each other. Thus, curve 25 is the Voronoi curve for the two seed points 21 and 22 in a medium with the heterogeneous propagation speed distribution shown in FIG. 5A.

Methods for Determining Critical Saddle Points

A saddle point of a distance field can be detected as a point where multiplication of two principal curvatures is negative or Gaussian curvature is negative. Since this calculus based method tends to be sensitive to numerical inaccuracies, the following saddle point detection method is preferred in this invention. As discussed in the previous section, critical points are detected (step 135 in the flow chart of FIG. 12) where two propagating fronts of different labels meet each other. Therefore, one principal curvature at a critical point is negative. Then, a critical saddle point can be detected as a critical point that has locally minimum arrival time among neighboring critical points: the other curvature is negative. In summary, a critical saddle point occurs where two fronts of different labels meet each other for the first time in its neighbor when a labeled fast marching progresses. Thus, for terminology clarification, a saddle point on a Voronoi curve, i.e. a curve of critical points, is for brevity sometimes referred to herein as a critical saddle point. From an implementation point of view, whenever a critical point is detected, an implementation algorithm can check its M-neighbors and test whether there exists any detected critical point with its arrival time less than the arrival time of the newly detected critical point. The term M -neighbors of a given cell means all of those cells that are no more than a pre-determined distance M away from the given cell. Here, the distance metric may include, but is not limited to, Euclidean (crow path) as well as city-block cell distances. In FIG. 5B, the points or cells at B and C are critical saddle points detected by implementing the proposed method with M=3.

Locally Optimal Paths among Objects

A locally optimal path between two objects (or seed points), S1 and S2, is defined as a path that is shorter than any other path in its spatial vicinity. Since a critical saddle point has the smallest arrival time among critical points in its vicinity, a combination of an optimal path between a critical point C and S1 and an optimal path connecting the critical saddle point C and S2 becomes a locally optimal path connecting S1 and S2. Determining locally optimal paths in this manner is step 136 of FIG. 12.

Figure 6:
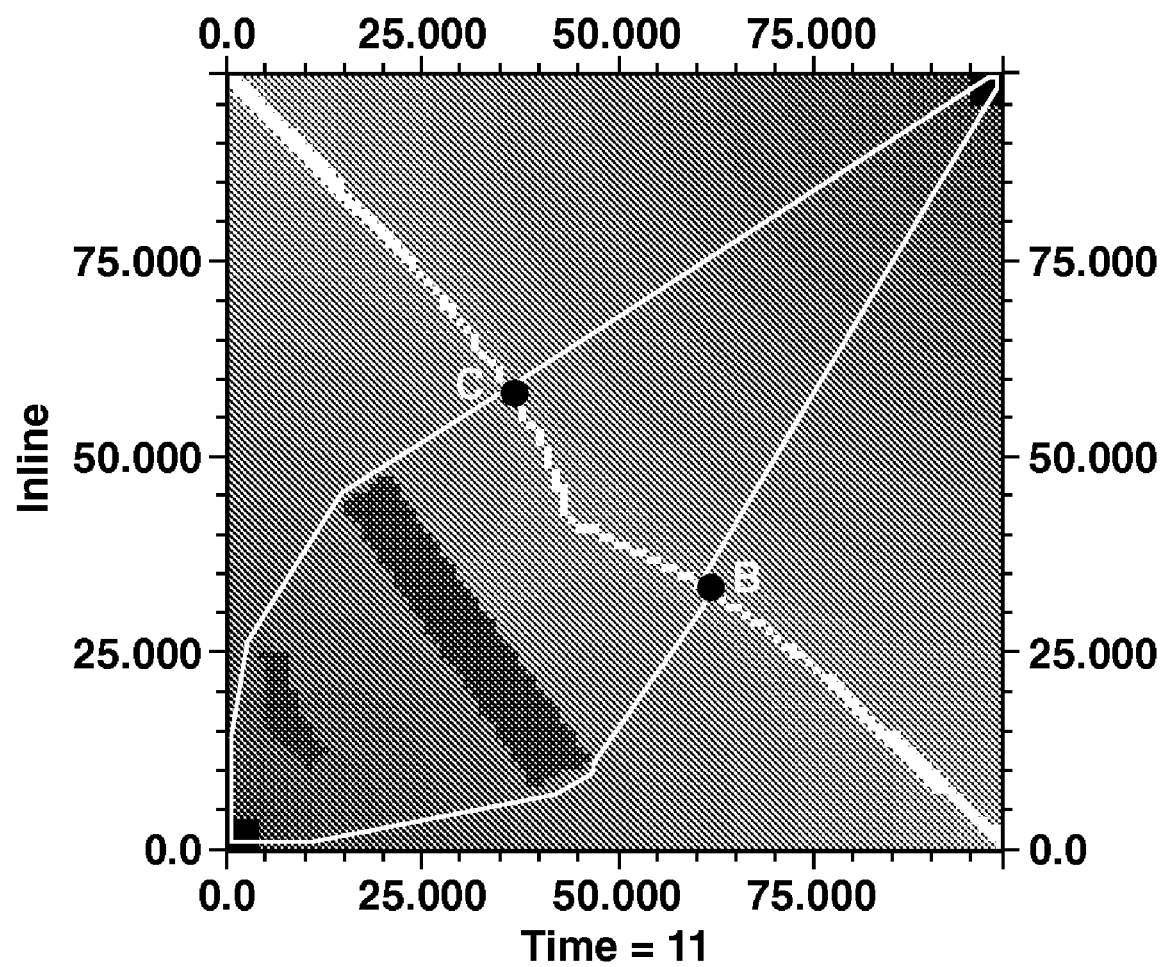
FIG. 6 shows locally optimal paths for the example of FIGS. 5A and 5B, in which optimal paths pass through two critical saddle points shown in black circles.

An optimal path from a critical saddle point to a seed point (or an object), for example seed point S1, is found by tracing backward following the propagation time (or the distance field) of the front that propagated from seed point S1. This may be done by solving an ordinary differential equation as suggested at pages 284-286 in the previously cited book by Sethian. The other part of the locally optimal path is found the same way using the propagation time associated with the other seed. The combined path is a locally optimal path between the two seeds (or objects). FIG. 6 shows two locally optimal paths that pass through the critical saddle points B and C for the example heterogeneous media in FIG. 6A. Even though the method of determining locally optimal paths was described for the case of two seed points in two dimensions, the same method applies for determining locally optimal paths among multiple objects and in three dimensions.

Figure 7A:
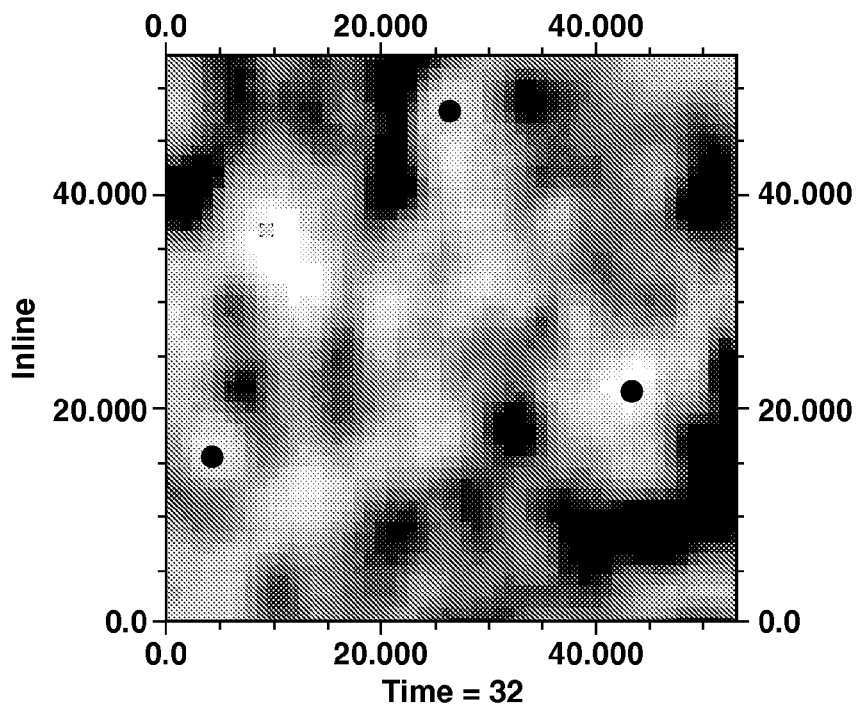
FIG. 7A shows an example two-dimensional reservoir where three wells are shown in black circles and reservoir quality is shown in gray scale.
Figure 7B:
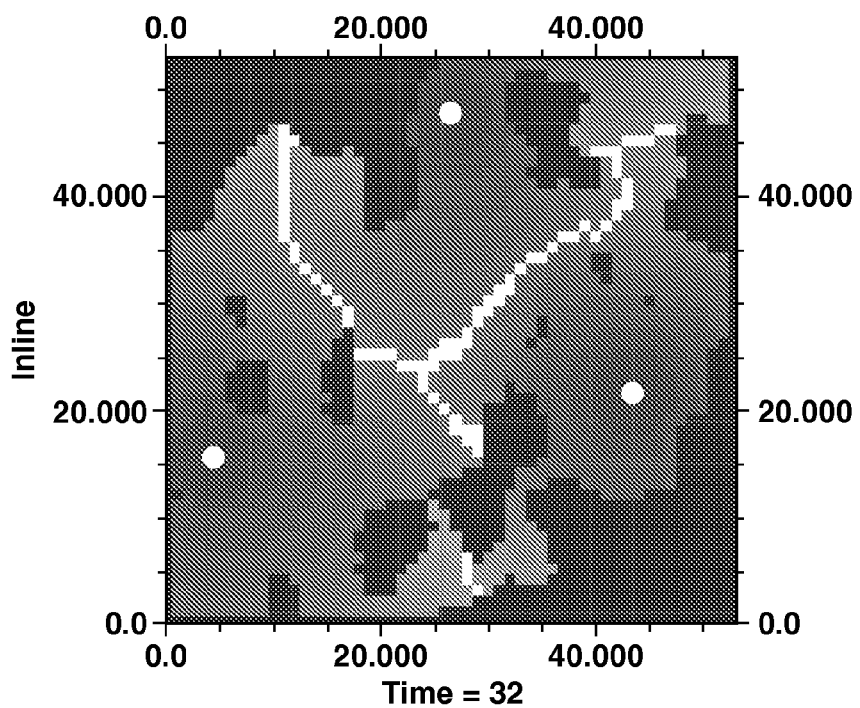
FIG. 7B shows a distance field from the three well locations of FIG. 7A and the Voronoi curves.
Figure 8:
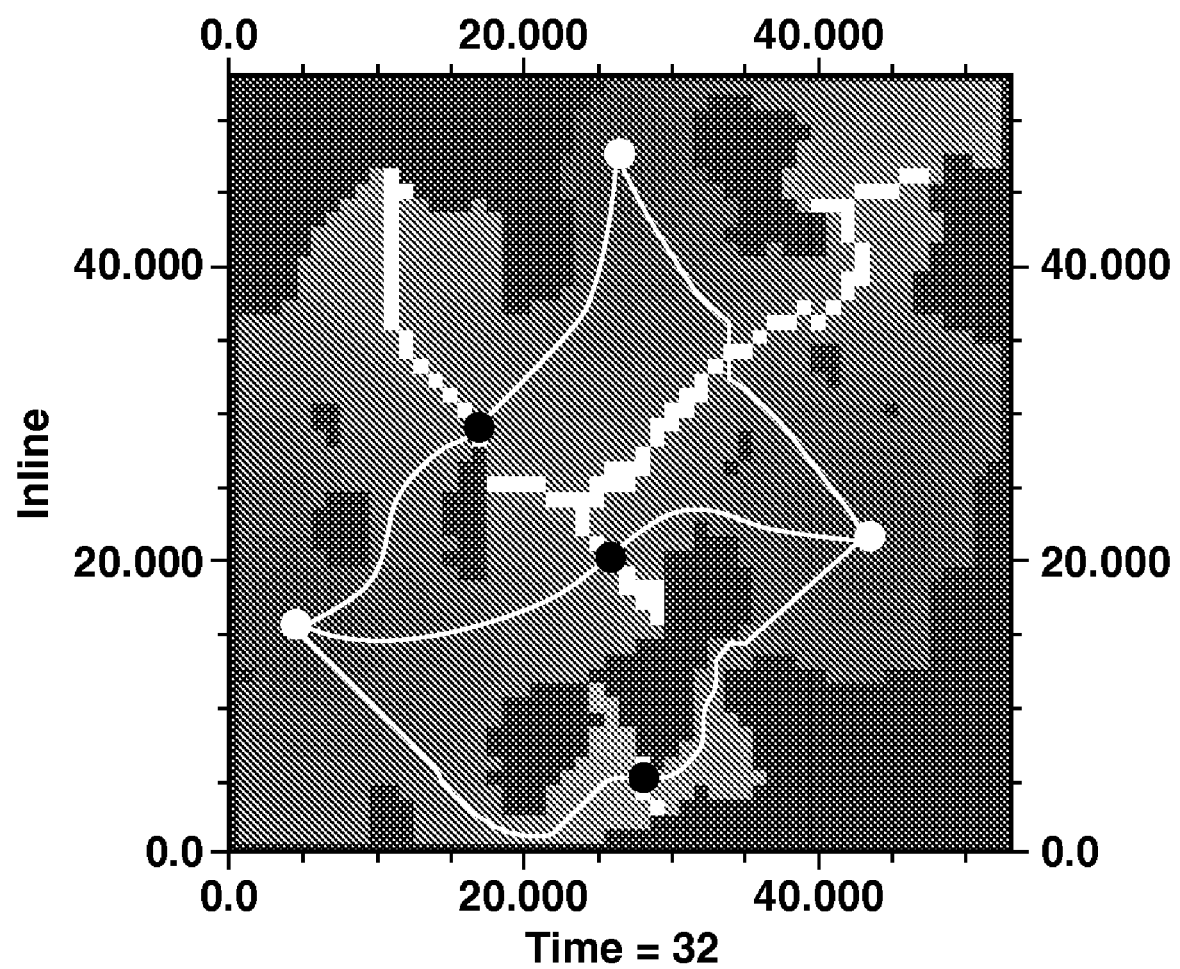
FIG. 8 shows locally optimal paths in white lines for the example of FIGS. 7A and 7B, in which optimal paths pass through four critical saddle points shown in black circles.

FIG. 7A is an example two-dimensional reservoir where three wells are located at black circles and the reservoir quality at each cell is shown in gray scale: lighter shades of gray corresponding to higher transmissibility or higher reservoir quality. FIG. 7B shows the distance field from the three wells (now white circles) in gray scale and Voronoi points or critical points indicated in white. FIG. 8 shows four locally optimal paths that pass through four critical saddle points (black circles) for the example heterogeneous media in FIG. 7A.

Voronoi Curves and Surfaces and Zone of Influence

As stated above, FIG. 7B shows the distance field from three wells in gray scale and the Voronoi curves indicated in white. (The black areas in FIG. 7B are areas where the speed of propagation or transmissibility is zero.) Since distance or arrival time to a cell is a measure of connectivity to that cell from a closest source, the Voronoi curves in FIG. 7B separate wells by their zones of influence, which is sometimes called the drainage pattern in an oil field. In three-dimensional data, the method will produce Voronoi surfaces instead of Voronoi curves. Therefore, Voronoi surfaces obtained in this invention can be used to identify zones of reservoir that are influenced by specific wells.

Application to Determining Connectivity Architecture of Seismic Data Volume

The methods described so far were developed to determine connectivity architecture of multiple objects in a three dimensional data volume. The objects include, but are not limited to, existing or proposed injection and/or production wells in addition to any geologically definable objects such as gas-water contact surfaces. However, it has been found that the same method can be used to determine the structural skeleton of two-dimensional and three-dimensional data volumes of seismic attributes where no object is predetermined. A good example of a seismic attribute volume is an impedance volume, which is derived from the original seismic amplitude data volume. (This is acoustic impedance, or the product of density and velocity.) The oil industry uses a variety of such "derived" seismic volumes, which are generally called seismic attribute volumes. A certain attribute volume may fairly well represent porosity or transmissibility or other characteristics of a hydrocarbon reservoir. In this case, one would like to have some skeletal representation of a reservoir that could provide visual and deeper insights into the connectivity architecture of a reservoir, especially for a visualization of a three-dimensional reservoir architecture in a seismic attribute volume.

Figure 9:
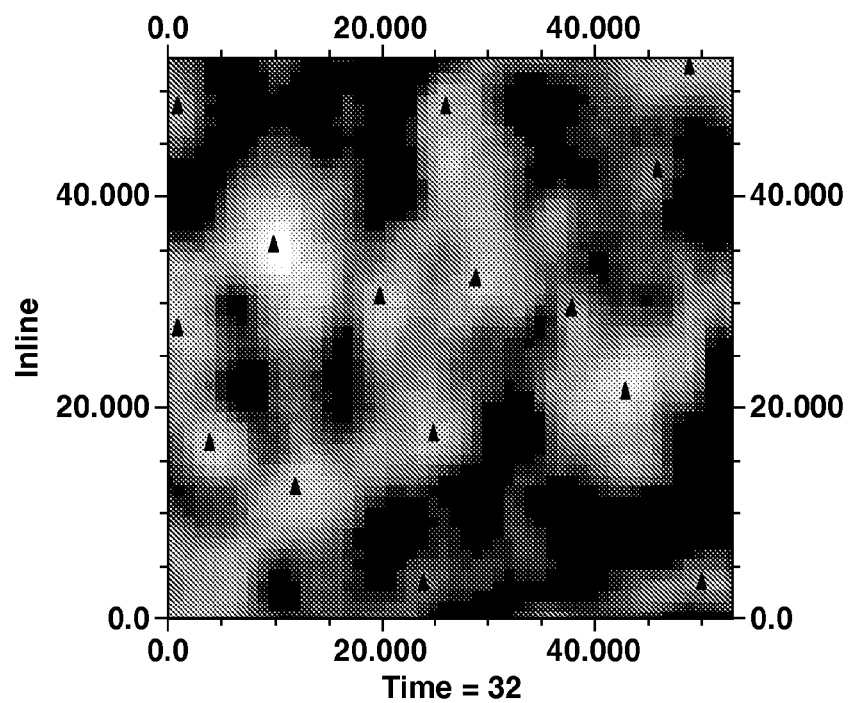
FIG. 9 shows an example two-dimensional seismic attribute displayed in 2D in gray scale, and sixteen detected seed points at locally maximum attribute values.
Figure 10:
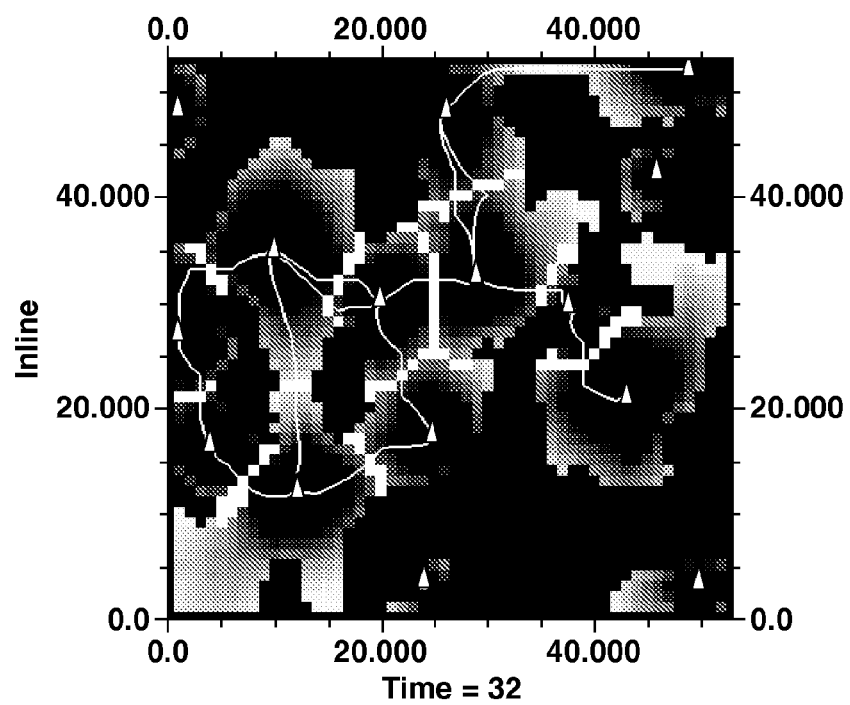
FIG. 10 shows distance fields from the sixteen seed points in gray scale for the example of FIG. 9, with Voronoi points (curve) shown in white cells and connected paths between seed points shown in white lines.
Figure 11:
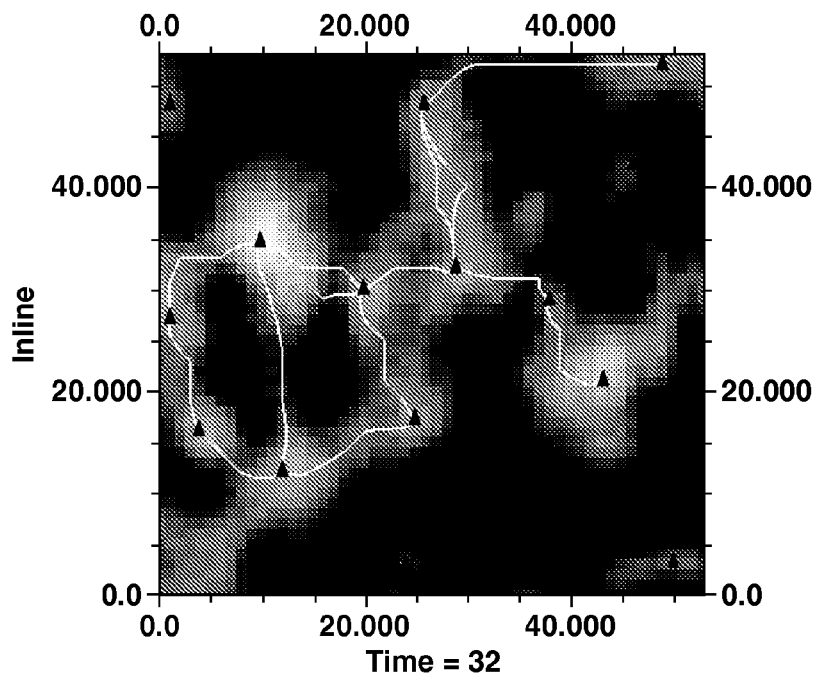
FIG. 11 shows the same connected paths between seed points as in FIG. 10 but displayed against seismic attribute image and FIG. 12 is a flowchart showing basic steps in one embodiment of the present inventive method.

Given a seismic attribute volume, initial seed points are determined by detecting locally maximum (or minimum) attributes in a seismic attribute volume, where a high (low) attribute value is desired to constitute the skeleton. FIG. 9 shows an example two dimensional seismic attribute data and sixteen detected seed points, depicted as black triangles. In this particular example, cells having locally maximum attribute values were identified as objects (seeds). Then, a speed function is assigned to allow fast propagation speed at cells with high (low) attribute values and low speed of propagation at cells with low (high) attribute values. In FIG. 9, high attribute values are in lighter gray scale representing higher propagation speed. Then, the present inventive method is used to determine connectivity architecture of seed points: propagating fronts from all the detected seed points simultaneously, detecting critical saddle points, and computing optimal paths that pass through critical saddle points. FIG. 10 shows (1) the distance field from sixteen seed points in gray scale, (2) critical (or Voronoi) points at cells in white color (3) locally optimal paths among seed points in white lines, where each path passes through a detected critical saddle point. In this example, the present inventive method determined connectivity architecture of 16 objects by using only 14 locally optimal paths. These 14 paths connect object pairs that are closest to each critical saddle point. Therefore, the present inventive method, by detecting critical saddle points, determines pairs of objects that participate in constructing connective architecture of multiple objects. If one used a method of determining connectivity architecture by constructing optimal paths between all combinatorial pairs of 16 objects, the resulting connectivity architecture would be crowded with paths connecting 120 (16 times 15 divided by 2) different pairs of objects. FIG. 11 shows the resulting seismic skeletal structure in white lines on a seismic attribute image, which fairly well represents or determines the connectivity structure of the seismic attribute image.

For illustrative purposes, the invention has been described using examples of determining connectivity architecture of relatively small number of objects or seed points in a two-dimensional space. However, the complexity of the problem and the value of this invention increase rapidly as the number of objects and degree of heterogeneity increases. A good application would be the problem of investigating connectivity architecture of 100 wells in a three-dimensional geologic model.

The present inventive method is considered to be an alternative or competing method to the method of analyzing reservoir connectivity described in the previously referenced WO 2006/127151. At least some of the steps in the present invention would typically be performed on a computer, i.e., the invention is computer-implemented in preferred embodiments. The connectivity information as well as Voronoi curves and surfaces may be outputted or stored in computer memory or other data storage devices as a final, real-world, concrete, tangible step.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for assessing connectivity between two or more objects in a hydrocarbon reservoir in order to manage development of the reservoir, comprising:
   (a) specifying a data volume of data elements on a discrete two or three-dimensional grid, said data representing a selected characteristic of the hydrocarbon reservoir at each cell in the grid;
   (b) specifying location of at least two objects in the data volume;
   (c) determining all Voronoi curves (2-D) or surfaces (3-D) in the data volume for the at least two objects as propagation seeds, said Voronoi curves or surfaces defining where fronts started simultaneously from each object meet, wherein front propagation speed at each cell location is a function of the data element at that cell;
   (d) locating all saddle points on the Voronoi curves/surfaces;
   (e) for each saddle point, finding a locally optimal path between two objects nearest to the saddle point by finding optimal paths between the saddle point and the two objects; and
   (f) assessing connectivity of the at least two objects based on the locally optimal paths connecting them.

2. The method of claim 1, wherein the data volume is a seismic attribute data volume.

3. The method of claim 1, wherein the data volume is heterogeneous, meaning the data elements in all cells do not have the same value.

4. The method of claim 1, wherein the objects consist of existing or proposed production or injection wells.

5. The method of claim 2, wherein the Voronoi curve/surface is determined using a front propagation speed function based on the seismic attribute.

6. The method of claim 1, wherein the Voronoi curve/surface is determined from a distance field representing front propagation distance from each of a corresponding pair of nearest objects.

7. The method of claim 6, wherein the fronts are propagated to generate the distance field by solving an Eikonal equation using the front propagation speed function.

8. The method of claim 7, wherein the Eikonal equation is solved by a fast marching method.

9. The method of claim 6, wherein the Voronoi curve/surface is determined by detecting top of ridges of the distance field.

10. The method of claim 1, wherein each saddle point is distinguished from neighboring points on the Voronoi curve/surface by having locally minimum front arrival times.

11. The method of claim 6, wherein the locally optimal path is found by tracing backward through the distance field from the saddle point to each of the two nearest objects.

12. The method of claim 1, further comprising inferring the reservoir's connectivity architecture from the locally optimal paths.

13. The method of claim 1, wherein Voronoi curves/surfaces are determined by assigning a unique label to each seed object, then labeling cells in the grid to track progress of the propagating fronts.

14. The method of claim 12, further comprising using the reservoir's connectivity architecture to manage development of the reservoir.

15. The method of claim 1, wherein the selected characteristic of the hydrocarbon reservoir is porosity or transmissibility.

16. The method of claim 1, further comprising:
developing the reservoir to produce hydrocarbons based at least in part on the connectivity assessment; and
producing hydrocarbons from the reservoir.

17. A method for producing hydrocarbons from a subsurface reservoir, comprising:
   (a) obtaining an assessment of connectivity of different parts of the reservoir, said connectivity assessment having been made by steps comprising:
      (i) specifying a data volume of data elements on a discrete two or three-dimensional grid, said data representing a selected characteristic of the subsurface hydrocarbon reservoir at each cell in the grid;
      (ii) specifying location of at least two objects in the data volume;
      (iii) determining all Voronoi curves (2-D) or surfaces (3-D) in the data volume for the at least two objects as propagation seeds, said Voronoi curves or surfaces defining where fronts started simultaneously from each object meet, wherein front propagation speed at each cell location is a function of the data element at that cell;

(iv) locating all saddle points on the Voronoi curves/surfaces;

(v) for each saddle point, finding a locally optimal path between two objects nearest to the saddle point by finding optimal paths between the saddle point and the two objects; and (vi) assessing connectivity of the at least two objects based on the locally optimal paths connecting them;

(b) relating each of the at least two objects to different parts of the reservoir; and (c) developing the reservoir to produce hydrocarbons based at least in part on the connectivity assessment.

* * * * *